United States Patent

[11] 3,585,922

[72] Inventors Hulda M. Peterson
 703 1st St. S.W., Rochester, Minn. 55901;
 Don M. Peterson, Box 244, Rushford,
 Minn. 55971
[21] Appl. No. 746,172
[22] Filed July 19, 1968
[45] Patented June 22, 1971

[54] ADJUSTABLE ROASTER BASKET
 8 Claims, 5 Drawing Figs.

[52] U.S. Cl. .................................................. 99/355,
 99/449, 99/450
[51] Int. Cl. .................................................. A47j 43/18
[50] Field of Search .................................. 99/355,
 359, 360, 426—27, 449, 450; 126/153, 165, 337,
 339; 211/43, 71, 106, 112, 118, 119

[56] References Cited
 UNITED STATES PATENTS
1,263,863 4/1918 Crosby ........................... 99/449
1,550,138 8/1925 Baker ............................. 99/426
2,216,457 10/1940 Salisbury ...................... 99/450 X
 FOREIGN PATENTS
214,302 4/1924 Great Britain ................ 99/450
453,795 4/1913 France .......................... 99/426
1,038,501 5/1953 France .......................... 99/450

Primary Examiner—Walter A. Scheel
Assistant Examiner—Arthur O. Henderson
Attorney—Robert M. Dunning ABSTRACT: An adjustable roaster basket is described, adapted to support a turkey or other meat item while being roasted. The basket includes a bottom grill and a pair of side members. Each side member includes a pair of parallel horizontal rods at the lower end which is slidably supported by the bottom grill to increase or decrease the distance between the sides. When the basket is removed from the roaster and placed upon a serving platter, the sides may be removed to expose the turkey for carving.

PATENTED JUN22 1971

3,585,922

INVENTOR
HULDA M. PETERSON
DON M. PETERSON
BY John M. Dunning
ATTORNEY

ADJUSTABLE ROASTER BASKET

This invention relates to an improvement in adjustable roaster basket and deals particularly with a device which is inserted into the roaster, and upon which the item being roasted is placed, to facilitate the removal of the item after or during the process of roasting.

Meat products such as turkeys and the like, are usually cooked in covered roaster pans. Difficulty is often experienced in removing the meat product from the roaster. For example, in the cooking of turkeys, the turkey often substantially fills the roaster and may be of considerable weight. When it is desired to remove the turkey from the roaster pan, it is usually necessary to engage opposite sides of the turkey to lift it from the relatively deep pan. If the turkey is fully cooked, this operation may cause considerable abrasion to the surface of the turkey. If the turkey is extremely well done, this operation may result in very material abrasion to the surface of the turkey, and may even cause disengagement of the wings or legs from the turkey during the removal process. It is an object of the present invention to provide a means of removing the meat product, such as the turkey, from the roaster pan so that it will be intact and be in proper form when placed upon the table prior to serving.

A further feature of the present invention resides in the provision of a basket of the type described in which the size of the device is adjustable to suit roaster pans of various dimensions, and to fit objects to be roasted which are of various dimensions, such as turkeys of different size. The basket is so arranged that the sides thereof may be adjusted toward or away from one another in order to accommodate a turkey therebetween regardless of the size of the bird.

A further feature of the present invention resides in the provision of a roaster basket of the type described which includes a base or bottom portion upon which the product rests during the roasting operations, and side portions adjustably secured to the bottom portion, ad designed to extend upwardly along opposite sides of the roaster pan. The sides of the basket are adjustable toward or away from one another for accommodation into roaster pans of various widths. Furthermore, the structure is such that after the turkey is removed from the roaster pan, the basket may be placed upon a serving platform and the sides of the basket may be removed to provide access to the turkey. The base portion of the basket then serves as a platform to support the base portion of the product above the level of the serving platter and to permit the product to be carved without interference.

A further feature of the present invention resides in the provision of roaster basket including a base or bottom portion formed of a series of rods which are supported by suitable supporting means above the surface of a serving platter or other plate upon which the basket is rested. This permits the juices from the product to drain through the base portion of the device unto the tray or platter from which these juices may be served.

These and other objects and novel features of the present invention will be more clearly and fully set forth in the following specification and claims.

In the drawings forming a part of the specification.

Figures 1, 2, 3, 4, 5:
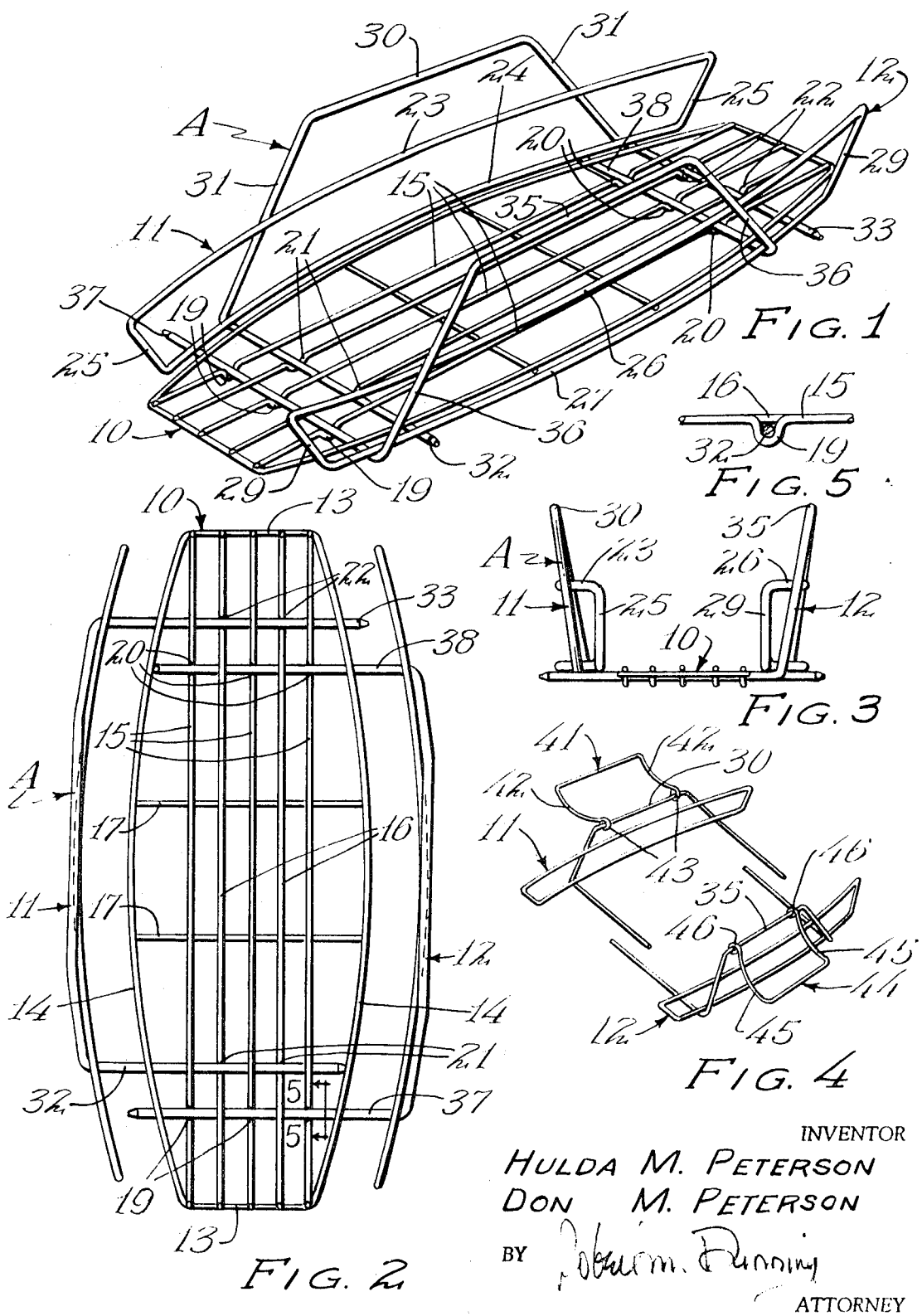
FIG. 1 is a perspective view of the adjustable roaster basket in readiness for use.
FIG. 2 is a top plan view of the device shown in FIG. 1.
FIG. 3 is an end elevational view of the basket shown in FIGS. 1 and 2.
FIG. 4 is a diagrammatic perspective view showing the side portions of the basket removed from the base portion thereof.
FIG. 5 is a detail section of the line 5–5 of FIG. 2.

In the following description, the word "turkey" has been used to describe the product being roasted. Obviously, roasts or other meats or foods could similarly be accommodated.

The adjustable roaster basket is indicated in general by the letter A. In general, the device includes a base or bottom section which is indicated in general by the numeral 10, and a pair of side members which are indicated in general by the numerals 11 and 12. The side members 11 and 12 are laterally adjustable relative to the base section 10.

The base section 10 is made of welded wire rod and is generally oval in outline and includes a pair of parallel end portions 13 which are connected by a pair of outwardly bowed sides 14. The parallel ends 13 are connected by a series of three parallel rods 15, and an intermediate pair of rods 16. The rods 15 and 16 are all parallel, and extend from one end 13 to the other. The rods 15 and 16 are supported in proper relation to the outwardly bowed sides 14 by means of a pair of crossbraces 17 which extend parallel to the ends 13 between the outwardly bowed sides 14, and which are spot welded or otherwise attached to the parallel supporting rods 15 and 16.

As is perhaps best illustrated in FIG. 1 and 5 of the drawings, the parallel supporting rods 15 are provided with downwardly projecting substantially U-shaped loops 19 near one end thereof, and similar downwardly projecting loops 20 near the opposite end thereof. The intermediate spring rods 16 are provided with downwardly extending loops 21 near one end thereof, and similar loops such as 22 near the opposite end thereof. The purpose of these loops will be described.

The generally similar sides 11 and 12 are slidably supported for movement transversely of the bottom section 10 of the basket. The side 11 includes an outwardly bowed upper rod portion 23, an outwardly bowed lower rod portion 24, and connecting ends 25 between the members 23 and 24 to form a loop which is bowed outwardly to follow the general contour of an oval roaster pan. The other side 12 is similarily provided with an outwardly bowed upper rod portion 26, an outwardly bowed lower rod portion 27, and connecting ends 29 connecting the ends of the members 26 and 27 to form an elongated loop. Thus the side 12 is similar to the side 11, but reversed in curvature. A handle rod 30 which is generally parallel to the upper member 23 of the side 11 is supported by downwardly and outwardly inclined supporting braces 31 which are spot welded or otherwise attached to the upper member 23 and lower member 24 of the frame side 11. The ends of the frame side 31 are bent into horizontal parallel relationship as indicated at 32 and 33. The member 32 is supported in the loops 21 of the frame members 16 near one end of the base portion 10, and the member 33 is supported in loops 22 in these same frame members 16 at the opposite end of the base. The parallel members 32 and 33 extend beneath the alternate rods or frame members 15 and are thus slidably supported in bearings provided by the loops 21 and 22.

The frame side member 12 also includes a handle rod 35 which is slidably supported by downwardly and outwardly inclined handle sides 36 which terminate in parallel rods 37 and 38. The rod 37 is slidably supported in the loops 19 of the rods 15 near one end of the bottom section 10, and the rod 38 is supported in the loops 20 in these same rods near the opposite end thereof. The parallel rods 37 and 38 extend beneath the rods 16 and are thus slidably supported for free lateral movement, and may position the sides 11 and 12 against the sidewalls of the roaster pan, or may permit the sides 11 and 12 to be completely removed from the base or bottom section 10 after the turkey or other object being roasted has been placed upon a serving platter or tray.

One of the advantages of the structure lies in the fact that it is not necessary to remove the turkey or other item being roasted from the base portion of the basket. The basket may be lifted from the roaster and raised upon a platter or serving tray, and the side portions may be removed so that the turkey may be readily carved. The base portion of the basket forms a support which tends to prevent the sliding of the turkey during the carving operation.

FIG. 4 of the drawings indicates a modified form of handle construction which may be employed in conjunction with deep roasting pans. In view of the fact that the side portions 11 and 12 are identical to those previous described, they have been given similar identifying numerals. The difference between the structure shown in FIG. 4 and the remaining figures lies in the addition of a generally U-shaped handle member 41 having substantially parallel curved ends 42 which are looped about the handle member 30 as indicated at 43. Similarily, a U-shaped handle 44 having curved substantially parallel sides 45 which are looped about the handle member 35 as indicated at 46. The handle members 41 and 45 may extend above the walls of the roasting pan to simplify the operation of removing the basket from the pan.

In accordance with the Patent Statutes, I have described the principles of construction and operation of my improvement in adjustable roaster basket, and while I have endeavored to set forth the best embodiment thereof I desire to have it understood that changes may be made within the scope of the following claims without departing from the spirit of my invention.

We claim:

1. An adjustable roaster basket including:
   an elongated bottom section adapted to support an item to be roasted,
   a pair of basket sides for opposite sides of said bottom section,
   a pair of horizontally extending parallel rods projecting from the lower edge of each of said basket sides,
   said bottom section including transversely spaced for slidably supporting said rods to permit movement of said sides toward or away from said bottom section.

2. The structure of claim 1 and in which the sides of said bottom section are bowed outwardly.

3. The structure of claim 1 and in which the bottom section includes a generally ovular frame having outwardly bowed sides and connecting ends, parallel longitudinally extending rods connecting the ends of said frame, and transversely extending reinforcing rods extending across said frame.

4. The structure of claim 1 and including a plurality of rods extending longitudinally of said bottom section and including downwardly projecting loops providing said bearings for slidably supporting said parallel rods.

5. The structure of claim 4 and in which alternate of said last named rods include loops forming said bearings for accommodating the parallel rods of one basket side and the remaining last named rods include loops forming said bearings for accommodating the parallel rods of the other frame side.

6. The structure of claim 1 and in which the basket sides each include an elongated generally rectangular wire loop, and in which the outer ends of said parallel rods of each frame side is bent to form handle supports extending upwardly across said loop, the upper ends of said upwardly extending handle supports being connected to provide a handle.

7. The structure of claim 6 and in which said handle supports incline upwardly and inwardly toward one another.

8. The structure of claim 7 and including a generally U-shaped auxiliary handle having the ends of the U-shaped handle pivotally connected to said handle.